United States Patent
Spears

(10) Patent No.: US 8,570,629 B2
(45) Date of Patent: Oct. 29, 2013

(54) RECIPROCATING LASER SCANNING DEVICE

(76) Inventor: Steve Spears, Sherwood, AZ (US)

( * ) Notice: Subject to any disclaimer, the term of this patent is extended or adjusted under 35 U.S.C. 154(b) by 285 days.

(21) Appl. No.: 13/243,311

(22) Filed: Sep. 23, 2011

(65) Prior Publication Data

US 2013/0077643 A1    Mar. 28, 2013

(51) Int. Cl.
*G02B 26/10* (2006.01)

(52) U.S. Cl.
CPC .................................... *G02B 26/10* (2013.01)
USPC ................... 359/199.1; 359/221.2; 359/226.2

(58) Field of Classification Search
USPC ............ 359/196.1–226.3; 250/234–236; 372/24; 235/435–486; 33/1 DD, 1 M, 33/227–299
See application file for complete search history.

(56) References Cited

U.S. PATENT DOCUMENTS

| | | | |
|---|---|---|---|
| 3,813,171 A | 5/1974 | Teach et al. | |
| 4,338,031 A | 7/1982 | Miller et al. | |
| 4,387,297 A | 6/1983 | Swartz et al. | |
| 4,830,489 A | 5/1989 | Cain et al. | |
| 5,144,120 A | 9/1992 | Krichever et al. | |
| 5,144,470 A | 9/1992 | Ota | |
| 5,254,844 A | 10/1993 | Krichever et al. | |
| 5,485,266 A | 1/1996 | Hirano et al. | |
| 5,525,791 A | 6/1996 | Krichever et al. | |
| 5,583,332 A | 12/1996 | Krichever et al. | |
| 5,671,540 A | 9/1997 | Davis | |
| 5,693,929 A | 12/1997 | Dvorkis et al. | |
| 5,907,145 A | 5/1999 | Krichever et al. | |
| 6,137,567 A | 10/2000 | Ohoka et al. | |
| RE37,318 E | 8/2001 | Porter | |
| 6,325,288 B1 * | 12/2001 | Spitz .......................... | 235/462.12 |
| 6,603,136 B1 | 8/2003 | Wagner et al. | |
| 6,670,627 B2 | 12/2003 | Takahashi et al. | |
| 6,769,992 B1 * | 8/2004 | Domulevicz et al. ............. | 473/2 |
| 7,880,865 B2 | 2/2011 | Tanaka et al. | |
| 7,884,923 B2 | 2/2011 | Kumagai et al. | |
| 7,922,751 B2 | 4/2011 | Shanks et al. | |
| 2006/0274930 A1 | 12/2006 | Laurent et al. | |
| 2007/0089309 A1 | 4/2007 | Kodaira | |
| 2009/0127240 A1 | 5/2009 | Sercel et al. | |

OTHER PUBLICATIONS

The Trimble 3D Scanning Brochure, located at: http://www.lasertools.com.au/trimble3dscanner.pdf.

* cited by examiner

*Primary Examiner* — Stephone B. Allen
*Assistant Examiner* — Jeffrey Madonna
(74) *Attorney, Agent, or Firm* — Marc E. Hankin; Kevin Schraven; Jimmy Sauz

(57) ABSTRACT

The present invention is a sweeping or reciprocating laser scanning device. The reciprocation or sweeping motion is cam driven. As the cam rotates, a lever arm is reciprocated or oscillated between two positions, which causes the laser or beam of light to move linearly, thus creating a triangular plane of light resulting in a reciprocating linear reference across the hypotenuse of the triangular plane of light.

11 Claims, 9 Drawing Sheets

RECIPROCATING LASER SCANNING DEVICE

FIELD OF THE INVENTION

The invention generally relates to laser scanner devices for reference marking and alignment purposes. More specifically, the present invention relates to reciprocating or oscillating scanning devices wherein the movement of the laser light creates a triangle plane of light and resulting linear reference across the hypotenuse of the triangular plane.

BACKGROUND OF THE INVENTION

A laser is a device that emits light, or electromagnetic radiation, through a process of optical amplification based on the stimulated emission of photons. The term "laser" was originally an acronym for "Light Amplification by Stimulated Emission of Radiation."

Lasers are used in thousands of ways in every sector of society, including consumer electronics, information technology, science, medicine, industry, law enforcement, entertainment, construction, and the military.

Typically, lasers are tightly focused to produce a collimated beam of light that creates a single spot of light on any surface that intersects the beam. If the beam of light is reciprocated, or swept back and forth in a linear fashion, a triangular plane of laser light is created by the inclusive angle of the laser's total sweep area, significantly increasing the area of coverage of the laser beam. Rather than a single spot termination, a linear reference is formed on the surface that the laser beam terminates on, at the hypotenuse of the triangular plane formed by the laser's sweep area. This linear reference is the result of the laser's dot image traveling back and forth over the surface in a linear fashion. If the laser's dot image is linearly scanned back and forth at a fast enough rate, the human eye perceives the scanned image as a solid line image.

Uses of the triangular plane may include scanning the laser vertically across a series of horizontally mounted sensors to determine deviation from a straight line between two distant points. In the construction or building industry, the feedback from the sensors may be used to keep machinery or equipment traveling in a "perfectly" straight line from point "A" to point "B", correcting for any left or right deviation along the way. This is one of the primary applications for the present invention. The triangular plane may also be used for leveling or grading applications such as agricultural field leveling, construction, or highway maintenance. Other uses of the triangular plane may include point cloud scanning A triangular plane created by a reciprocating laser may be used instead of the X & Y mirrors and galvanometers to reduce cost.

Regarding uses of the line image, one of the oldest known uses for the laser line termination is the bar code scanner. The scanned line image formed could also be used as a straight line reference for alignment of material, machinery, tools and other applications in assembly and manufacturing applications.

In addition to lines formed by reciprocating the laser beam, line images are also created optically. One of the advantages of a reciprocating line image is that it is typically brighter and more visible (depending on the rate of the scan, sweep, or reciprocation) than line images formed with optics, due to the absorption and reflection loss created from the optical line lenses. Other uses for laser line images as guidelines are numerous, and include everything from painting stripes on airplanes to alignment of logs before they are cut at a sawmill, and many others.

Several references disclose devices and methods that create a triangular plane of light and/or a laser line termination. Typically, these references disclose a device for actuating the laser back and forth or tilting a mirror back and forth, which in turn causes the laser beam to sweep. For example, U.S. Pat. No. 5,691,535 uses two moveable mirrors for laser scanning systems, which create a light beam, directed along a path to a stationary mirror element. The light beam is focused by a lens and directed by a first moveable mirror and a second moveable mirror, which each are coupled to galvanometers. The galvanometers, which are controlled by electronic controllers, use the mirrors to deflect the light beam, as it scans surfaces in a "bow-tie" pattern.

Similarly, U.S. Published Patent Application No. 2010/0256940 also employs a laser scanning system with mirrors. The laser scanning system includes a laser light source, a mirror, a distance measuring unit, and a control unit. The laser light source projects the light beam into a minor which then deflects the beam for scanning. The distancing measuring unit calculates the distance of an object by detecting the light quantity of the reflected laser beam as received while the control unit drives and controls both the light source and distance measuring unit.

Despite the various structures and configurations, most laser scanning systems use mirrors to deflect the light beam to create the triangular plane. This was preferred because it was believed that moving non-minor components was impractical. However, minor movements are not always desirable in every application.

Regarding references that disclose the movement of the laser component, rather than a minor component, U.S. Pat. Nos. 5,144,120, 5,254,844, 5,583,332, 5,907,145, and 5,525,791, all issued to Krichever, discloses various embodiments of a mirrorless scanner with a movable laser light source. The Krichever mirrorless laser scanner is a hand-held barcode scanning system that includes a laser light source component mounted on a shaft, which is attached to a motor or actuator. The motor provides repetitive twisting movements. The problem with the Krichever mirrorless laser scanners is that the back and forth twisting movements of the motor are very inefficient, require a significant power source, and quickly burn out the motor. The motor burns out quickly because the twisting movement is not a natural movement for a motor. Furthermore, this causes problems with excessive torque produced from changing directions.

Therefore, what is needed is a laser scanning device with a robust laser light source which reciprocates or sweeps a laser light beam efficiently without undue stress on the laser light source or the reciprocation motor.

SUMMARY OF THE INVENTION

To minimize the limitations in the prior art, and to minimize other limitations that will become apparent upon reading and understanding the present specification, the present invention discloses a new and useful laser scanning device.

One embodiment of the present invention is a laser scanning device comprising: one or more motors; a cam; an impact member or pressure roller; a lever arm; a pivot; and one or more light sources. The cam is attached to the one or more motors. The one or more motors rotate the cam. The cam includes one or more lobes and the one or more lobes of the cam periodically pushes the impact member vertically angularly when the one or more motors rotate the cam. Rather than vertically, the movement may be in any direction, including horizontally.

The impact member is fixedly attached substantially near a rear end of the lever arm and the pushing of the impact member by the one or more lobes of the cam moves the lever arm vertically and angularly along the pivot, which is positioned substantially near the center of the lever arm. The one or more light sources are fixedly attached substantially near a front end of the lever arm. The one or more light sources moves vertically and angularly when the rear end of the lever arm is periodically pushed vertically and angularly by the one or more lobes of the cam against the impact member along the pivot. Preferably, the laser scanning device further comprises of one or more return springs and one or more surfaces. The one or more return springs is attached between the lever arm and the one or more surfaces of the laser scanning device; and the one or more light sources moves vertically and angularly to its original position by the one or more return springs when the one or more lobes of the cam does not push against the impact member. Preferably, the laser scanning device includes one or more controllers; wherein the one or more motors is a speed-controlled motor; and wherein the one or more controllers communicate electrical signals to the speed-controlled motor to adjust the rotating speed of the speed-controlled motor. Preferably, the one or more motors include a secondary motor; wherein the secondary motor moves the lever arm horizontally. Preferably, the secondary motor is a speed-controlled motor; wherein the one or more controllers communicate electrical signals to the secondary speed-controlled motor to adjust the speed of the secondary speed-controlled motor. The one or more light sources generally are one or more light or laser emitting diodes. The lever arm with the one or more light sources may move vertically or horizontally and angularly on each half revolution of the cam. The laser scanning device may further comprise of one or more sensors; wherein the one or more sensors detect light beam reflections from the one or more light sources. The vertical and angular movements of the lever arm may be readjusted by repositioning the pivot. The vertical and angular movements of the lever arm may be readjusted by repositioning the cam. The angular movements of the lever arm may be readjusted by resizing the cam.

Another embodiment of the present invention is a laser scanning device comprising: one or more motors; a cam; an impact member; a lever arm; a pivot; one or more light sources; one or more return springs; and one or more surfaces. The cam is attached to the one or more motors, and the one or more motors rotate the cam. The cam includes one or more lobes, and the one or more lobes of the cam periodically pushes the impact member when the one or more motors rotate the cam. The impact member is fixedly attached substantially near a rear end of the lever arm, and the pushing of the impact member by the one or more lobes of the cam moves the lever arm horizontally and angularly along the pivot. The pivot is positioned substantially near the center of the lever arm. The one or more light sources is attached substantially near a front end of the lever arm. The one or more light sources moves horizontally and angularly when the lever arm is periodically pushed by the one or more lobes of the cam against the impact member along the pivot. The one or more return springs is attached between the lever arm and the one or more surfaces of the laser scanning device. The one or more light sources moves horizontally and angularly to its original position by the one or more return springs when the one or more lobes of the cam does not push against the impact member. Preferably, the one or more light sources is one or more light or laser emitting diodes. Preferably, the laser scanning device includes one or more controllers; wherein the one or more motors is a speed-controlled motor; and wherein the one or more controllers communicate electrical signals to the speed-controlled motor to adjust the rotating speed of the speed-controlled motor. The one or more motors should include a secondary motor; wherein the secondary motor moves the lever arm vertically while the one or more lobes of the cam pushes the lever arm horizontally and angularly. The secondary motor should be a speed-controlled motor; wherein the one or more controllers communicate electrical signals to the secondary speed-controlled motor to adjust the speed of the secondary speed-controlled motor. The laser scanning device may further comprise of one or more sensors; wherein the one or more sensors detects light beam reflections from the one or more light sources. The lever arm with the one or more light sources may move horizontally and angularly on each half revolution of the cam.

Another embodiment of the invention is a laser scanning device comprising: one or more motors; one or more cams; one or more lever arms; one or more pivots; and one or more light sources. The motors rotate the cams. The cams are preferably an irregular cylinder that has at least one protrusion. The lever arms are connected to the pivots and the light sources are mounted onto the lever arms. The each of the light sources emits a beam of light. As the cams rotate, the protrusion(s) of the cams alternatingly push then release the lever arms, such that the lever arms pivot on the pivots, this, in turn, cause the beam of light move linearly in a back and forth motion between a released position of the lever arms and a pushed position of the lever arms. Preferably the laser scanning device also includes: a housing; and one or more return springs. The return springs are attached to both the lever arms and the housing. The return springs provide tension against the protrusion of the cams when the protrusion of the cams pushes the lever arms, such that the lever arms return to the released position when the protrusion of the cams releases the lever arms. Preferably, the lever arms are further comprised of one or more impact members, which are in contact with the cams. When the cams rotate, the protrusion alternatingly or reciprocatingly pushes and then releases the impact members of the lever arms. The scanning device preferably includes one or more controllers, which communicate electrical signals to the motors to adjust a rotation speed of the motors. Typically, the motors have one or more shafts that are connected to the cams, such that when the shafts rotate, the cams are concurrently rotated. Preferably, the cams are adjustable, which effects a change in at least the pushed position. The pivots, or position of the pivots, may also be adjustable, which also changes, at least, the pushed position.

Another embodiment of the invention is a laser scanning device comprising: one or more motors; one or more cams; one or more lever arms; one or more pivots; one or more light sources; and one or more reflective surfaces. The motors rotate the cams. The cams have at least one protrusion. The lever arms are connected to the pivots, and the reflective surfaces are mounted onto the lever arms. The lasers or light sources emit a beam of light, which is directed at the reflective surfaces. Preferably, the laser is stationary in this embodiment. The reflective surfaces reflect the beam of light, such that a reflected beam of light is created. As the cams rotate, the at least one protrusion of the one or more cams alternatingly pushes then releases the one or more lever arms, such that the one or more lever arms pivot on the one or more pivots, such that the one or more lever arms and the one or more reflective surfaces reciprocates between a pushed position of the one or more lever arms and a released position of the one or more lever arms, which causes the reflected beam of light to be reflected from the one or more reciprocating reflective surfaces angularly to create a triangular plane of light. Preferably, the laser scanning device includes: a housing; and one or more return springs. The return springs provide tension against the protrusion of the cams when the protrusion of the cams pushes the lever arms, such that the lever arms return to the released position when the protrusion of the cams releases the lever arms. Preferably, the lever arms are further comprised of one or more impact members, which are in contact with the cams. When the cams rotate, the protrusion alternatingly, or reciprocatingly, pushes and then releases the impact members of the lever arms. The scanning device preferably includes one or more controllers, which communicate electrical signals to the motors to adjust a rotation speed of the motors. Typically, the motors have one or more shafts that are connected to the cams, such that when the shafts rotate, the cams are concurrently rotated. Preferably, the cams are adjustable, which effects a change in at least the pushed position. The pivots, or position of the pivots, may also be adjustable, which also changes, at least, the pushed position.

One embodiment of the present invention is a laser scanning device comprising: one or more motors; a cam; a pressure roller; a lever arm; a pivot; and one or more light sources. The cam is attached to the one or more motors. The one or more motors rotate the cam. The cam includes one or more lobes and the one or more lobes of the cam periodically pushes the pressure roller angularly when the one or more motors rotate the cam. The pressure roller is fixedly attached substantially near a rear end of the lever arm and the pushing of the pressure roller by the one or more lobes of the cam moves the lever arm angularly along the pivot, which is positioned substantially near the center of the lever arm. The one or more light sources are fixedly attached substantially near a front end of the lever arm. The one or more light sources moves opposingly angularly when the rear end of the lever arm is periodically pushed angularly by the one or more lobes of the cam against the pressure roll along the pivot. Preferably, the laser scanning device further comprises of one or more return springs and one or more surfaces. The one or more return springs is attached between the lever arm and the one or more surfaces of the laser scanning device; and the one or more light sources moves angularly to its original position by the one or more return springs when the one or more lobes of the cam does not push against the pressure roller. Preferably, the laser scanning device includes one or more controllers; wherein the one or more motors is a speed-controlled motor; and wherein the one or more controllers communicate electrical signals to the speed-controlled motor to adjust the rotating speed of the speed-controlled motor. Preferably, the one or more motors include a secondary motor; wherein the secondary motor moves the lever arm horizontally. Preferably, the secondary motor is a speed-controlled motor; wherein the one or more controllers communicate electrical signals to the secondary speed-controlled motor to adjust the speed of the secondary speed-controlled motor. The one or more light sources generally are one or more laser emitting diodes. The lever arm with the one or more light sources may move vertically or horizontally and angularly on each half revolution of the cam. The laser scanning device may further comprise of one or more sensors; wherein the one or more sensors detect light beam reflections from the one or more light sources. The amount of angular movements of the lever arm may be readjusted by repositioning the pivot. The angular movements of the lever arm may be readjusted by repositioning the cam. The angular movements of the lever arm may be readjusted by resizing the cam.

Another embodiment of the present invention is a laser scanning device comprising: one or more motors; one or more cams; one or more lever arms; one or more pivots; and one or more light sources. The one or more motors rotate the one or more cams. The one or more lever arms are connected to the one or more pivots. The one or more light sources are mounted onto the one or more lever arms. The one or more light sources emit a beam of light. The one or more cams rotate, the one or more cams alternatingly pushes then releases the one or more lever arms, such that the one or more lever arms pivot on the one or more pivots, such that the beam of light moves linearly in a back and forth motion between a released position of the one or more lever arms and a pushed position of the one or more lever arms. Preferably, the one or more lever arms are further comprised of one or more impact members. The one or more cams are preferably in contact with the one or more impact members. As the one or more cams rotate, the one or more cams alternatingly pushes then releases the one or more impact members of the one or more lever arms. Preferably, the one or more impact members are further comprised of one or more padded surfaces. The one or more padded surfaces typically protects the one or more impact members from the pushes of said one or more cams. The one or more cams preferably have at least one protrusion. Preferably, as the one or more cams rotate, the at least one protrusion of the one or more cams alternatingly pushes then releases the impact members of the one or more lever arms, such that the one or more lever arms pivot on the one or more pivots, such that the beam of light moves linearly in a back and forth motion between a released position of the one or more lever arms and a pushed position of the one or more lever arms. Preferably, the laser scanning device further comprises a housing and one or more return springs. The one or more return springs are preferably attached to the one or more lever arms and the housing, and generally, the one or more return springs provide a tension against the at least one protrusion of the one or more cams when the at least one protrusion of the one or more cams pushes the one or more lever arms, such that the one or more lever arms return to the released position when the at least one protrusion of the one or more cams releases the one or more lever arms. Preferably, the laser scanning device further comprises one or more controllers. The one or more controllers generally communicate electrical signals to the one or more motors to adjust a rotation speed of the one or more motors. Preferably, the one or more motors are comprised of one or more shafts, and the one or more shafts are typically connected to the one or more cams, such that when the one or more shafts rotate the one or more cams are concurrently rotated. The one or more cams may be adjustable; and the adjusting of the one or more cams changes at least the pushed position. The one or more pivots may be adjustable; and the adjusting the one or more pivots typically changes the at least the pushed position.

The present invention may also include a sensor device, which typically includes photosensors and/or photodetectors. The sensor device is used to detect the light beams of the laser scanning device, and may also be used to measure the distance and/or position of a light beam by calculating the intensity, time delay, angle or position of the light signal.

It is an object of the present invention to provide an efficient, affordable, and easy to use oscillating laser scanning device with an improved structure that is capable of performing position alignment, long distance leveling, centerline extension, and positioning and placement indication.

It is an object of the present invention to overcome the limitations in the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

Figure 1:
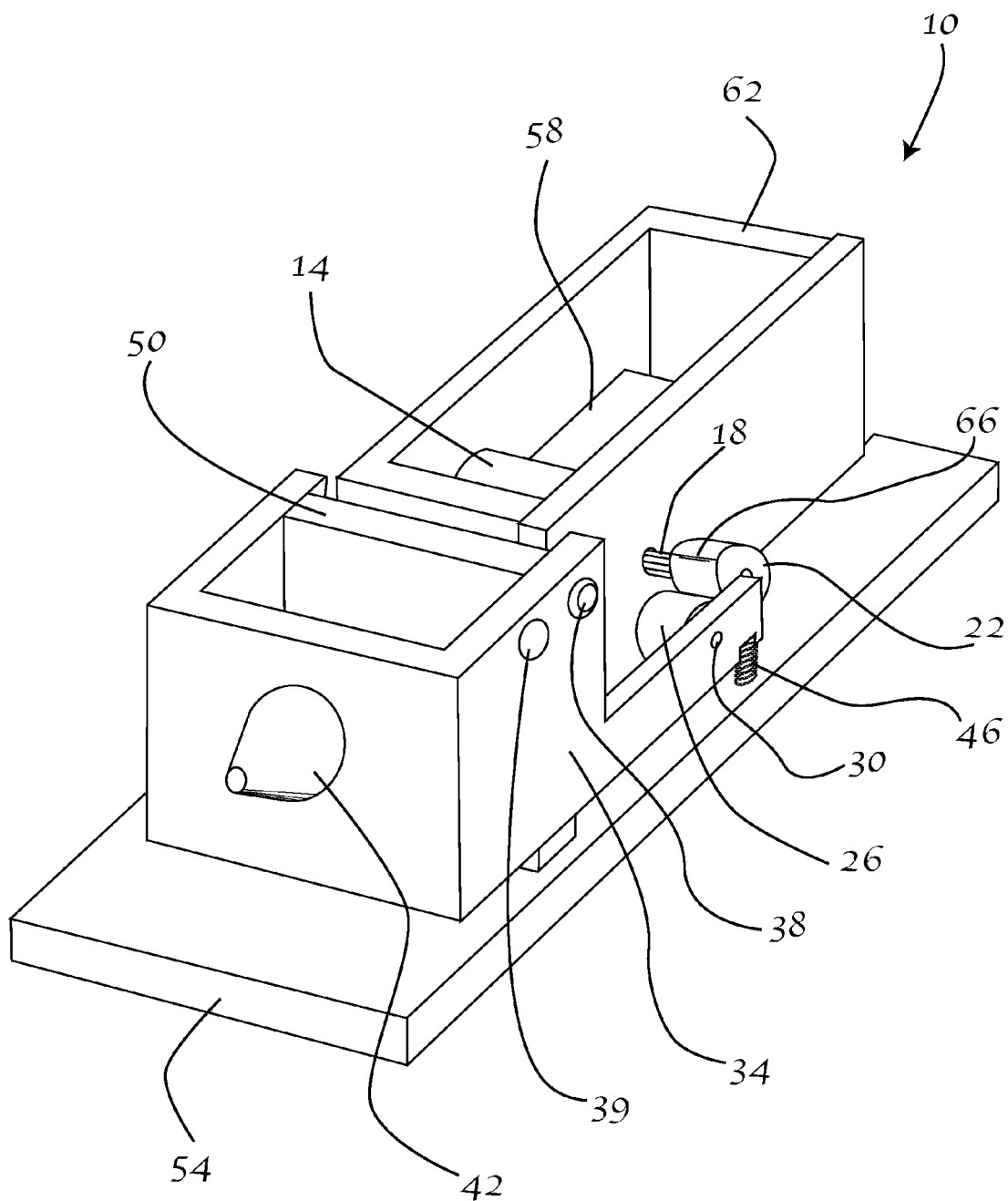
FIG. 1 is an illustration of a perspective view of one embodiment of the laser scanning device.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. The term "light source", "light", or "laser" refer to any device that emits light, high-intensity light beams, or electromagnetic radiations, preferably through a process of optical amplification based on the stimulated emission of photons, including without limitation, a light emitting diode semiconductor device, photonic light source, pulse source, gas laser tube, solid state laser, fiber optic laser, photonic laser, photonic crystal laser, or dye laser. The term "cam" refers to any device with an irregular but smooth, rounded shape or device with a round outer circumference with an offset inner axis/shaft hole. The irregular shape or off-set inner axis/shaft hole of a round/regular shape causes the outer circumference of the cam to rotate along an elliptical path, rather than a circular path. The cam may include a protrusion, designed to make sliding contact with another device while the cam is rotating. In this manner, rotational movement is converted to reciprocal or variable motion. The term "protrusion" refers to any device that is an extension beyond the usual limits of a regular, circular (or cylindrical) surface, that is detachably part of, or permanently attached to, the cam. The protrusion may include, without limitation, lobes, lumps, nubs, bumps, bulges, wedges, segments, extensions, additions, augments, attachments, or anything of a regular or irregular extension of the cam. The term "shaft" refers to any device with a long, narrow, substantially cylindrical body that is rigid and may include, but is not limited to, poles, bars, handles, rods, beam, axis, axles, cylinders, pivots, sticks, or any rod-like shape. The term "motor" refers to any electromotor or a pneumatic driven motor that is designed to convert electrical energy into useful mechanical motion and that may receive electric signals, including, but not limited to, rotary motors, brushless motors, speed-controlled motors, stepper motors, electric motors, linear motors, traction motors, actuators, hydraulic actuators, heat engines, combustion engines, turbines, molecular motors, hydraulic engines, or any device that imparts motion. The term "lever arm" refers to any substantially rigid device that pivots about one pivot point or line, and may have any structure so long as the lever arm is able to act as a lever. The term "pivot" refers to any line, axis, or point of rotation in a lever system, or the center point of any rotational system, including but not limited to, hinges, axles, pins, axis, focal points, hub, shaft, spindle, swivel, or any turning points. The term "action of the cam" refers to transforming rotary motion into linear (or actuating) motion or vice-versa. The term "release" refers generally to the cessation or stopping of the pushing action or motion by the cam protrusion on the lever arm (or impact member (if present)), but the cam may or may not still be in physical contact with the lever arm (or impact member (if present)). The term "push" refers to exert force or apply pressure, preferably directly or indirectly, for the purpose of moving something, including, contacts, touches, strikes, collisions, impacts, thrusts, bashes, punches, blows, or any physical exertions upon another object. The term "controller" refers to any chip, integrated circuit, or other computing device, including, but not limited to, smart cards, circuit cards, chips, integrated circuits, motor controllers, wire boards, adapters, card adapters, universal serial bus devices, wireless devices, or any device or group of devices that governs in some predetermined manner the performance of another device, or electric motor. The term "chip" or "integrated circuit" (IC) refers to any device that processes electrical information, including without limitation, semiconductors, circuits, analog circuits, digital circuits, gates, switches, flip-flops, or any interconnection of electrical elements (e.g., resistors, inductors, and/or capacitors).

FIG. 1 is an illustration of a perspective view of one embodiment of the laser scanning device. As shown in FIG. 1, the laser scanning device 10 preferably includes: motor 14, motor shaft 18, a cam 22, impact member 26, attachment device 30, lever arm 34, pivot 38, light source 42, return spring 46, housing 50, housing base 54, controller 58, motor housing portion 62, and protrusion 66. The laser scanning device may also include one or more sensors, which are well known in the art to detect and/or measure qualities relating to the light source 42 and feedback from the light source 42. Pivot 38 is preferably a standard pivot and may include one or more notches or holes, pivot bearings, and/or an axle.

Preferably, the electronic controller 58 electronically communicates with the motor 14 to control, turn on, turn off, actuate and/or control the speed of the motor 14. However, the electronic controller 58 may also manipulate other components of the laser scanning device 10, such as activating the light sources 42 and/or the sensors. While the electronic controller 58 is preferably located inside the motor housing portion 62 of the laser scanning device 10, the electronic controller 58 may be located outside the motor housing portion 62 such as on the housing base 54, or even remotely, without deviating from the scope of the invention. Although only one motor 14, one shaft 18 (or motor shaft), one cam 22, one impact member 26, one attachment device 30, one lever arm 34, one pivot 38, one light source 42, one return spring 46, one housing 50, one controller 58, one motor housing portion 62, and one protrusion 66 are shown in FIG. 1, any number, or none at all, may be present without deviating from the scope of the invention. Additionally, housing 50, as shown in FIG. 1 is preferably comprised of housing base 54, and motor housing 62, but housing 50 may be of any shape, include any parts, and may surround or interconnect with the other parts of the laser scanning device 10 in numerous ways without deviating from the scope of the invention.

FIG. 1 shows that, preferably, the cam 22 is attached to the motor shaft 18 and the motor shaft 18 is moveably attached to the motor 14 through the motor housing 62. The motor 14 is best protected when it is positioned inside the motor housing 62. However, the motor 14 may be positioned anywhere, inside or outside the motor housing 62. Preferably, motor shaft 18 and cam 22 are positioned near the lever arm 34 and/or the impact member 26, such that the protrusion 66 of the cam 22 has the ability to physically push, strike, contact, or engage with, the impact member 26 or lever arm 34 when the motor 14 rotates the cam 22. The impact member 26 is preferably part of the lever arm 34, but, as shown in FIG. 1 it may be a separate device that is attached to lever arm 34. Typically, the impact member 26 is attached substantially near the rear end of the lever arm 34, and is connected via attachment device 30. However, any attachment device or substance may be used to connect the impact member 26 to lever arm 34. Further, the impact member 26 may be located anywhere on the lever arm 34, so long as lever arm 34 can pivot on pivot 38.

FIG. 1 shows that lever arm 34 is preferably moveable in relationship to housing 50 at pivot 38. However, the pivot 38 may be positioned anywhere between housing 50 and lever arm 34 so long as the lever arm 34 may be reciprocated or oscillated by cam 22. As shown in FIG. 1, the pivot 38 functions by allowing the lever arm 34 to move vertically up and down with respect to the ground and housing 50, in angular and/or linear motion, similar to a "seesaw." The pivot 38 may be adjusted to pivot 39, or some other pivot location, which would alter the angle of the reciprocation.

FIG. 1 shows that the return spring 46 is typically positioned between the rear end of the lever arm 34 and housing base 54. However the return spring 46 may be positioned anywhere on the present invention, such as between the rear end of the lever arm 34 and motor housing 62, without deviating from the scope of the invention. The return spring 46 functions by tensioning or pulling the rear end of the lever arm 34 back to its original position after protrusion 66 of the cam 22 releases, or stops pushing, the impact member 26.

FIG. 1 shows that the light source 42 is preferably mounted or attached at the front end of the lever arm 34. However, the light source 42 may be positioned anywhere on the lever arm 34.

The motor 14 preferably includes, or is directly connected to, a cam 22 and motor shaft 18 (which, when combined, are frequently referred to as a camshaft), and may include additional components, as desired or needed. The motor 14 may be powered by direct current or alternating current power sources. The cam 22 and motor shaft 18 are usually made of metal, but the cam 22 and motor shaft 18 can be constructed out of any strong and impact and friction resistant materials, such high impact plastic or any natural or manmade material. The impact member 26 is usually made of high-impact materials such as metal, rubber, or a high-density polymer, but impact member 26 may be constructed out of any other high strength materials. The laser scanning device 10 is preferably made out of high quality metal or plastic, but it can be made out of any natural or man-made material, without deviating from the scope of the invention.

Figure 2:
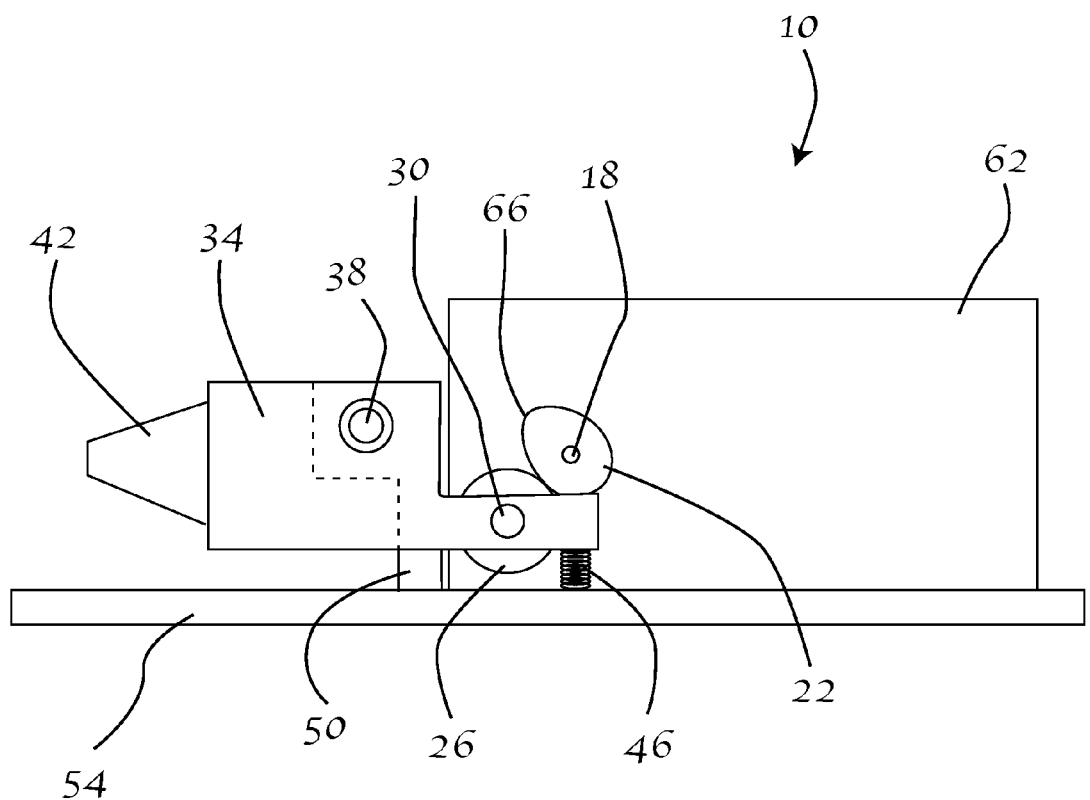
FIG. 2 is an illustration of a side view of one embodiment of the laser scanning device.

FIG. 2 is an illustration of a side view of one embodiment of the laser scanning device. As shown in FIG. 2, the laser scanning device 10 preferably includes: motor shaft 18, a cam 22, impact member 26, attachment device 30, lever arm 34, pivot 38, light source 42, return spring 46, housing 50, housing base 54, motor housing portion 62, and protrusion 66.

Figure 3:
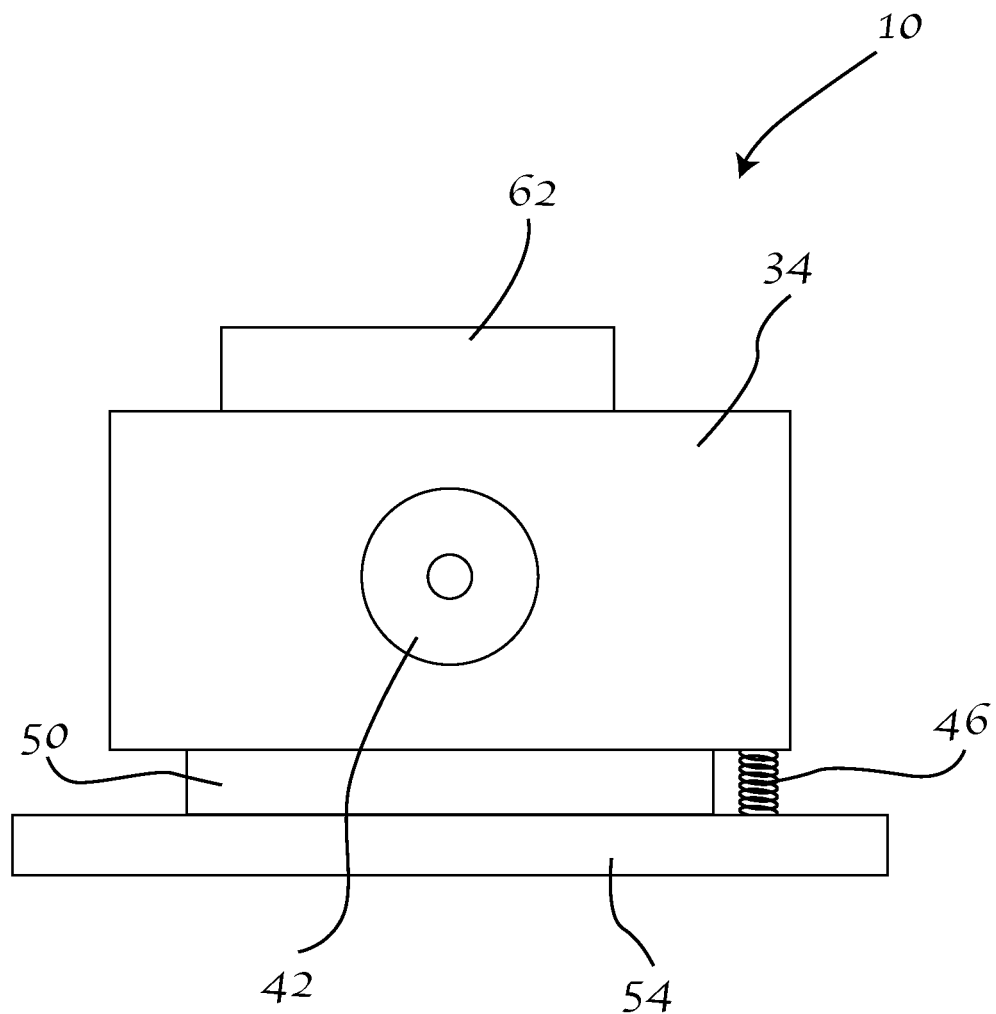
FIG. 3 is an illustration of a front view of one embodiment of the laser scanning device.

FIG. 3 is an illustration of a front view of one embodiment of the laser scanning device. As shown in FIG. 3, the laser scanning device 10 preferably includes: lever arm 34, light source 42, return spring 46, housing 50, housing base 54, and motor housing portion 62.

Figure 4:
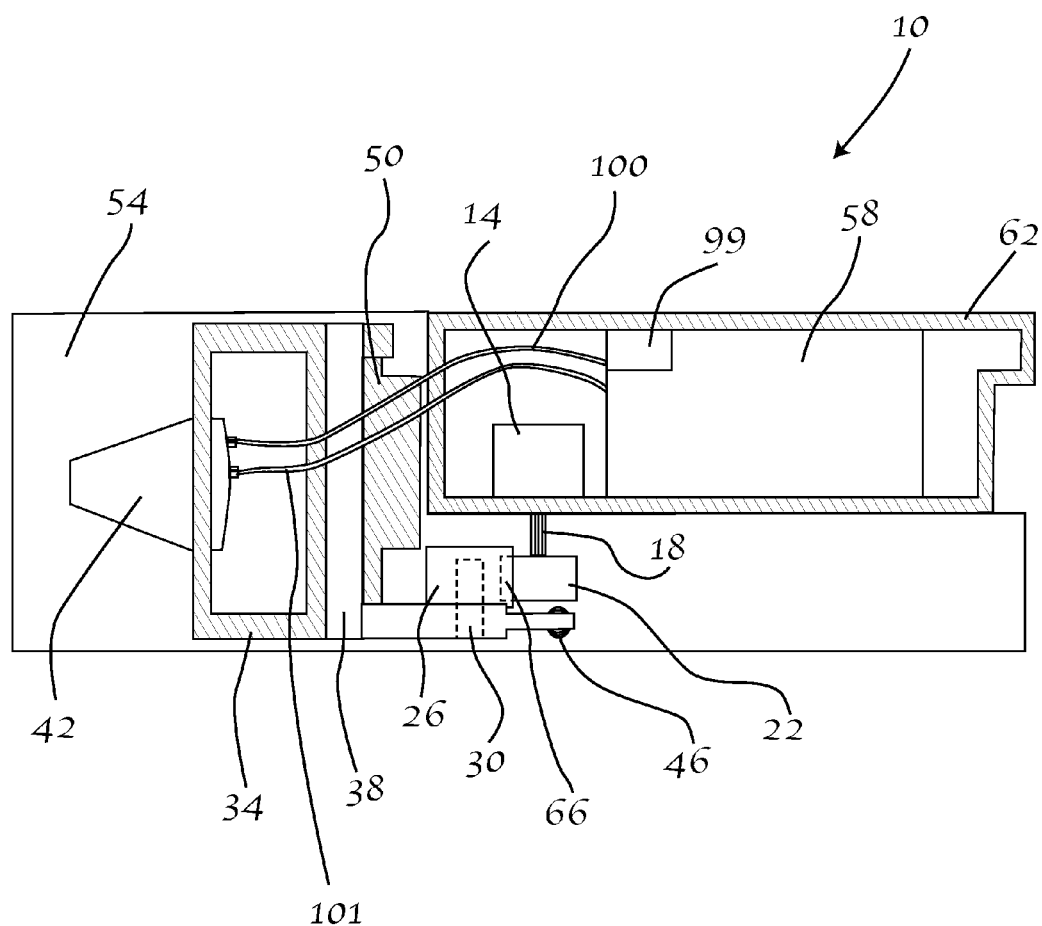
FIG. 4 is an illustration of a top view of one embodiment of the laser scanning device.

FIG. 4 is an illustration of a top view of one embodiment of the laser scanning device. As shown in FIG. 1, the laser scanning device 10 preferably includes: motor 14, motor shaft 18, a cam 22, impact member 26, attachment device 30, lever arm 34, pivot 38, light source 42, return spring 46, housing 50, housing base 54, controller 58, motor housing portion 62, protrusion 66, power supply 99, and wires 100, 101. Preferably wire 100 delivers power from power supply 99 to light source 42, and wire 101 delivers electrical signals from the controller 58 to light source 42. Alternatively, light source 42 may be controlled wirelessly.

Figure 5:
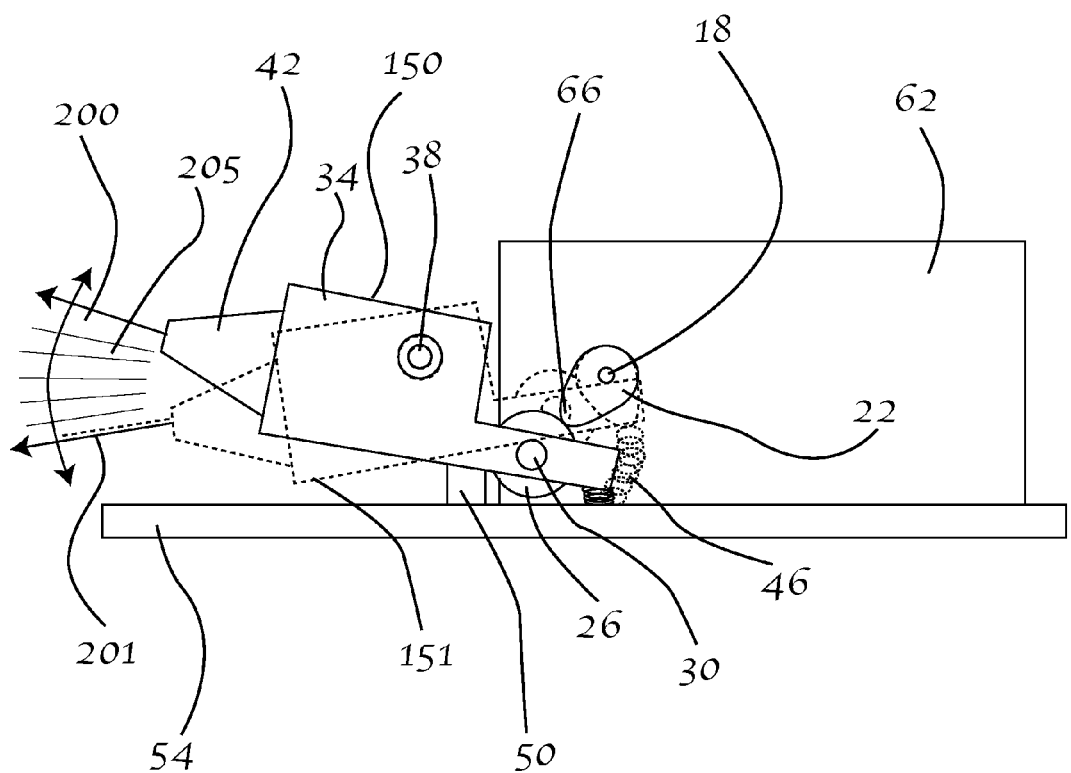
FIG. 5 is an illustration of a side view of one embodiment of the laser scanning device and shows a movement of the laser scanning device.

FIG. 5 is an illustration of a side view of one embodiment of the laser scanning device and shows a movement of the laser scanning device. As shown in FIG. 5, the laser scanning device 10 preferably includes: motor shaft 18, a cam 22, impact member 26, attachment device 30, lever arm 34, pivot 38, light source 42, return spring 46, housing 50, housing base 54, motor housing portion 62, protrusion 66, pushed position 150, released position 151, light beam pushed position 200, light beam released position 201, and triangular plane of light 205. FIG. 5 shows the operation of the laser scanning device 10 as the motor 14 rotates cam 22. Specifically, FIG. 5 shows that as the motor 14 drives the motor shaft 18, the cam 22 and protrusion 66 likewise rotates in response to the rotation of the motor 14. As a result, the protrusion 66 of the cam 22 physically strikes, engages with, or otherwise pushes on lever arm 34, or more specifically on impact member 26. This causes the rear end of the lever arm 34 to move downward, which causes the forward end of the lever arm 34, along with light source 42, to angle upward as lever arm 34 pivots on pivot 38. At the point where protrusion 66 has pushed lever arm 34 to a furthest away point, the lever arm 34 is in a pushed position 150. As the cam 22 continues to rotate, the return spring 46 pulls the lever arm 34 back into a released position 151. As the cam 22 rotates, the lever arm 34 oscillates, see-saws, or reciprocates linearly between a pushed position 150 and a released position 151. This causes the beam of light that is emitted from the light source 42 to oscillate between a light beam pushed position 200 and a light beam released position 201, which forms a triangular plane of light 205. At the other end of the triangular plane of light a line of light would be displayed on whatever surface the beam of light contacts. While FIG. 5 shows cam 22 rotating counter-clockwise, it should be understood that the present invention also allows cam 22 to move clockwise as well.

Figure 6:
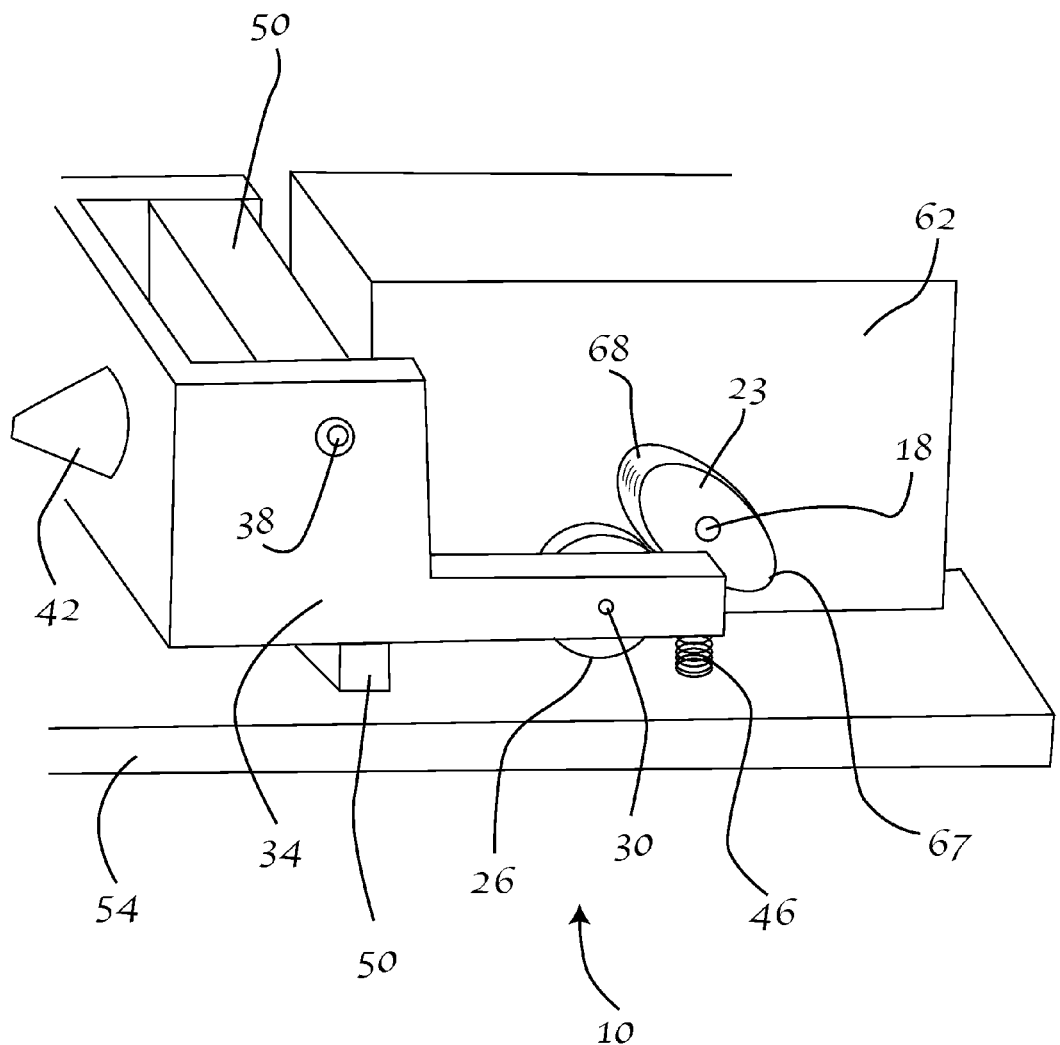
FIG. 6 is a detailed illustration of a perspective side view of one portion of one embodiment of the laser scanning device and shows a cam with two protrusions.

FIG. 6 is a detailed illustration of a perspective side view of one portion of one embodiment of the laser scanning device and shows a cam with two protrusions. As shown in FIG. 6, the laser scanning device 10 preferably includes: motor shaft 18, a cam 23, impact member 26, attachment device 30, lever arm 34, pivot 38, light source 42, return spring 46, housing 50, housing base 54, motor housing portion 62, and protrusions 67 and 68. FIG. 6 shows that the cam 22 may have two protrusions 67, 68 that alternate striking or pushing the impact member 26. It should be understood that additional protrusions may be added to the invention without deviating from the scope of the invention. Assuming the rotation rate of cam 22 and cam 23 are the same, the oscillation rate of the light source 42 with cam 23 would be double that of the light source with cam 22. Although protrusions 66, 67 and 68 are preferably a single unitary part of cam 22 or 23, the protrusions may be a separate piece and may even be removable without deviating from the scope of the invention.

Figure 7:
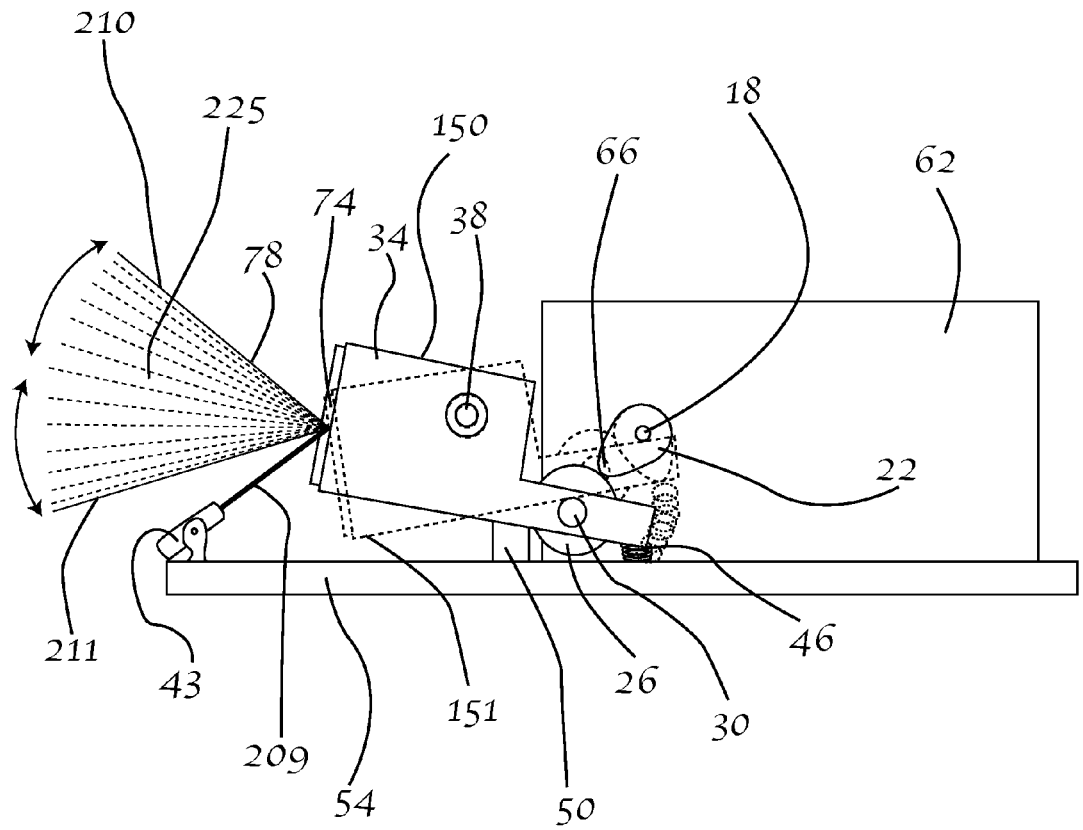
FIG. 7 is an illustration of a side view of one embodiment of the laser scanning device with a reflective surface.

FIG. 7 is an illustration of a side view of one embodiment of the laser scanning device with a reflective surface. As shown in FIG. 7, the laser scanning device 10 preferably includes: motor shaft 18, a cam 22, impact member 26, attachment device 30, lever arm 34, pivot 38, light source 43, return spring 46, housing 50, housing base 54, motor housing portion 62, protrusion 66, reflective surface 74, pushed position 150, released position 151, reflected light beam pushed position 210, reflected light beam released position 211, and triangular plane of reflected light 225.

FIG. 7 shows the operation of the laser scanning device 10 wherein the light source 43 is stationary, but a reflective surface 74 oscillates to create a triangular plane of reflected light 225. As shown in FIG. 7, the light source 43 creates a beam of light 209 directed at reflective surface 74. FIG. 7 shows that as the motor 14 drives the motor shaft 18, the cam 22 and protrusion 66 likewise rotates in response to the rotation of the motor 14. As a result, the protrusion 66 of the cam 22 physically strikes, engages with, or otherwise pushes on lever arm 34, or more specifically on impact member 26. This causes the rear end of the lever arm 34 to move downward, which causes the forward end of the lever arm 34, along with reflective surface 74, to angle upward as lever arm 34 pivots on pivot 38. At the point where protrusion 66 has pushed lever arm 34 to a furthest away point, the lever arm 34 is in a pushed position 150. As the cam 22 continues to rotate, the return spring 46 pulls the lever arm 34 back into a released position 151. As the cam 22 rotates, the lever arm 34 oscillates, see-saws, or reciprocates linearly between a pushed position 150 and a released position 151. This causes the beam of light 209 that is emitted from light source 42, and then reflected off reflective surface 74, to oscillate between a reflected light beam pushed position 210 and a reflected light beam released position 211, which forms a triangular plane of reflected light 225. At the other end of the triangular plane of reflected light 225, a line of light would be displayed on whatever surface the beam of reflected light contacts. Preferably reflective surface 74 is a mirror. While FIG. 7 shows cam 22 rotating counter-clockwise, it should be understood that the present invention also allows cam 22 to move clockwise as well.

While FIG. 7 shows a single mirror or reflective surface 74, any number of mirrors may be included without deviating from the scope of the invention. Although FIG. 7 shows a stationary light source, the light source may be in motion.

Figure 8:
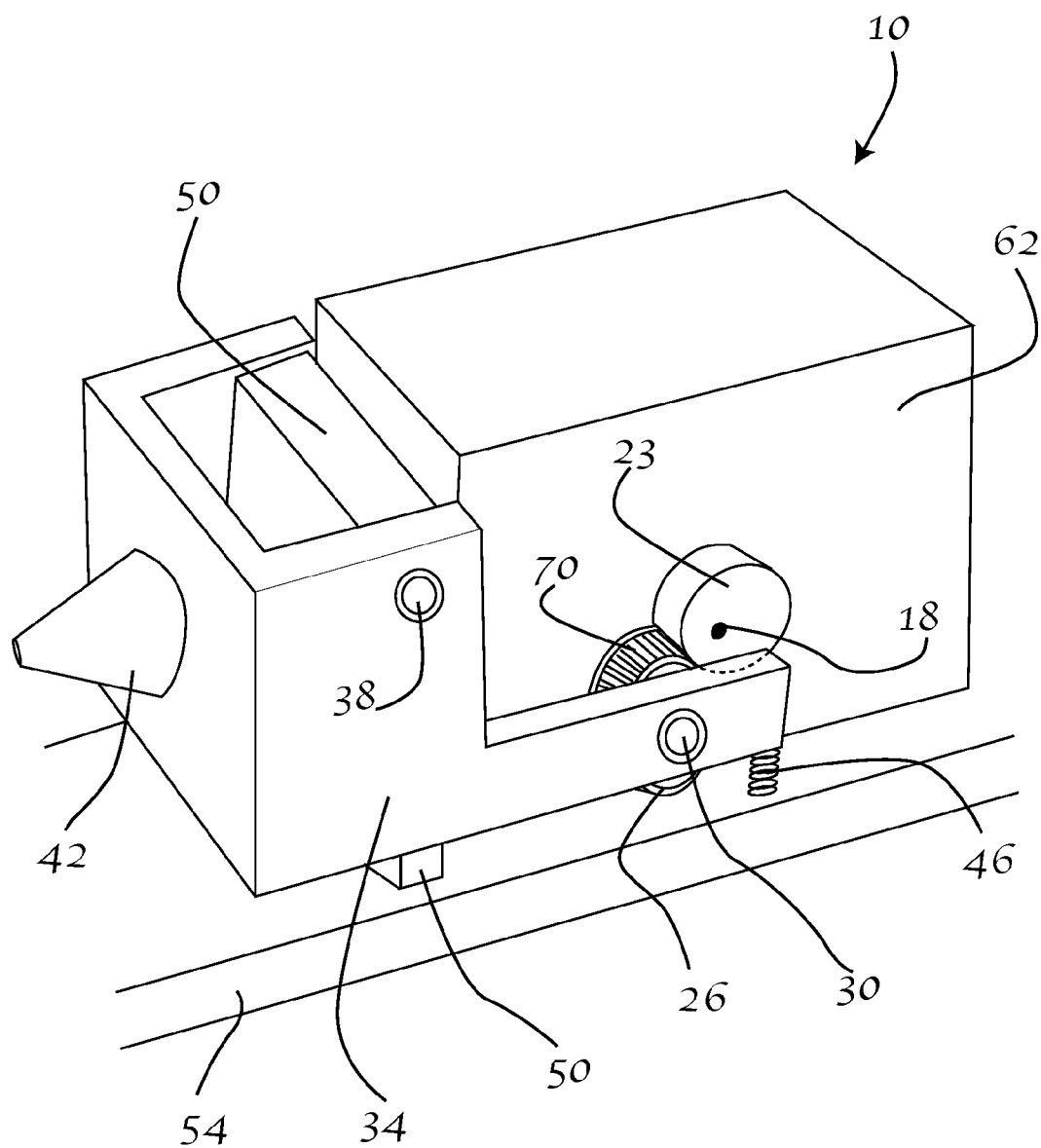
FIG. 8 is a detailed illustration of a perspective side view of one portion of one embodiment of the laser scanning device and shows an impact member with a padded surface and a cam without a protrusion.

FIG. 8 is a detailed illustration of a perspective side view of one portion of one embodiment of the laser scanning device and shows an impact member with a padded surface and a cam without a protrusion. As shown in FIG. 8, and as preferred, the laser scanning device 10 may include: motor shaft 18, a cam 23, impact member 26, attachment device 30, lever arm 34, pivot 38, light source 42, return spring 46, housing 50, housing base 54, motor housing portion 62, and padded surface 70. As shown in FIG. 8, the cam 23 lacks a protrusion, but is connected to the motor shaft 18 in an off-centered or off-set manner. This configuration provides the cam 23 with the ability rotate disproportionately with respect to the motor shaft 18, such that, when the cam 23 rotates, a portion of the cam 23 pushes, strikes, contacts, or engages elliptically with the impact member 26, causing lever arm 34, along with light source 42, to pivot on pivot 38. This configuration may be preferred because it should have less torque stress than a cam 23 with a protrusion.

FIG. 8 also shows an impact member 26 with a padded surface 70. The padded surface 70 typically provides more protection for the impact member 26 against the strikes, pushes, or rolling action of the cam 23. The padded surface 70 is usually made of rubber, but may be constructed out of any strong and impact and friction resistant material, such high impact plastic or any natural, synthetic, artificial material such as metal, rubber, high-density polymer, plastic, or wood.

Figure 9:
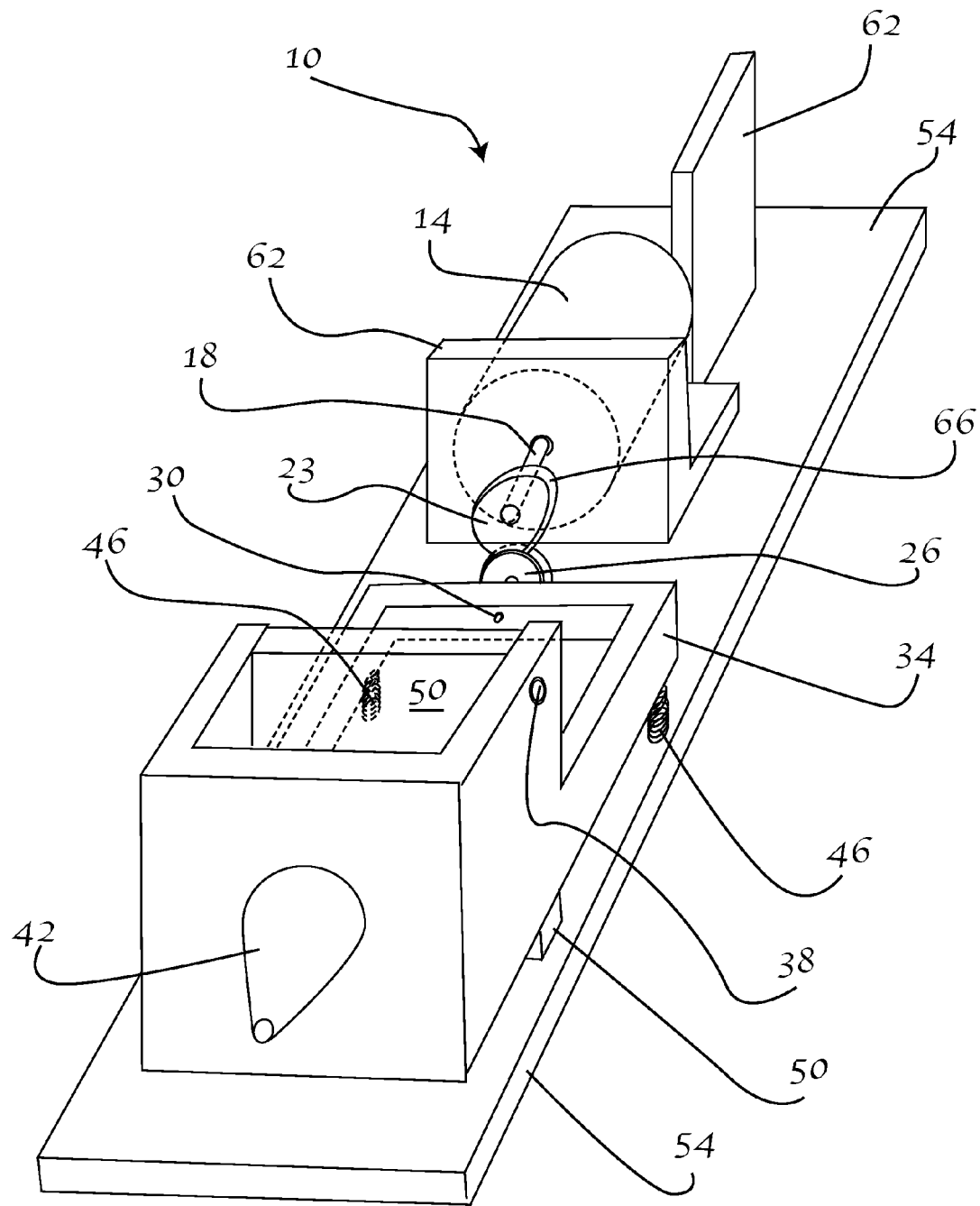
FIG. 9 is an illustration of a perspective view of one embodiment of the laser scanning device with an inline motor.

FIG. 9 is an illustration of a perspective view of one embodiment of the laser scanning device with an inline motor. As shown in FIG. 9, the laser scanning device 10 preferably includes: motor 14, motor shaft 18, a cam 23, impact member 26, attachment device 30, lever arm 34, pivot 38, light source 42, return springs 46, housing 50, housing base 54, and motor housing portion 62. As shown in FIG. 9, the laser scanning device 10, may include two return springs 46, which are both used to counteract the strikes, pushes, and action of the cam 23. Any number of return springs 46 may be used and they may be positioned anywhere on the present invention. FIG. 9 shows the motor 14 preferably connected to the cam 22 and motor shaft 18 such that motor 14 is placed substantially in-line with laser or light source 42.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and that is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent to the public, regardless of whether it is or is not recited in the claims.

What is claimed is:

1. A laser scanning device comprising:
one or more motors;
one or more cams;
one or more lever arms;
one or more pivots; and
one or more light sources;
wherein said one or more motors rotate said one or more cams;
wherein said one or more lever arms are connected to said one or more pivots;
wherein said one or more light sources are mounted onto said one or more lever arms;
wherein said one or more light sources emit a beam of light; and
wherein as said one or more cams rotate, said one or more cams alternatingly pushes then releases said one or more lever arms, such that said one or more lever arms pivot on said one or more pivots, such that said beam of light moves linearly in a back and forth motion between a released position of said one or more lever arms and a pushed position of said one or more lever arms.

2. The laser scanning device of claim 1, wherein said one or more lever arms comprising one or more impact members;
wherein said one or more cams are substantially in contact with said one or more impact members; and
wherein as said one or more cams rotate said one or more cams alternatingly pushes then releases said one or more impact members of said one or more lever arms.

3. The laser scanning device of claim 2, wherein said one or more impact members comprising one or more padded surfaces;
wherein said one or more padded surfaces protect said one or more impact members from said one or more cams.

4. The laser scanning device of claim 1, wherein said one or more cams have at least one protrusion;
wherein as said one or more cams rotate, said at least one protrusion of said one or more cams alternatingly pushes then releases said impact members of said one or more lever arms, such that said one or more lever arms pivot on said one or more pivots, such that said beam of light moves linearly in a back and forth motion between a released position of said one or more lever arms and a pushed position of said one or more lever arms.

5. The laser scanning device of claim 1, further comprising:
a housing; and
one or more return springs;
wherein said one or more return springs are attached to said one or more lever arms and said housing; and
wherein said one or more return springs provide a tension against said at least one protrusion of said one or more cams when said at least one protrusion of said one or more cams pushes said one or more lever arms, such that said one or more lever arms return to said released position when said at least one protrusion of said one or more cams releases said one or more lever arms.

6. The laser scanning device of claim 5, further comprising:
one or more controllers;
wherein said one or more controllers communicate electrical signals to said one or more motors to adjust a rotation speed of said one or more motors.

7. The laser scanning device of claim 6, wherein said one or more motors are comprised of one or more shafts;
wherein said one or more shafts are connected to said one or more cams, such that when said one or more shafts rotate said one or more cams are concurrently rotated.

8. The laser scanning device of claim 7, wherein said one or more cams are adjustable; and
wherein adjusting said one or more cams changes at least said pushed position.

9. The laser scanning device of claim 8, wherein said one or more pivots are adjustable; and
wherein adjusting said one or more pivots changes said at least said pushed position.

10. A laser scanning device comprising:
a motor;
a cam;
a lever arm;
a pivot;
a light source;
a housing;
a return spring; and
a controller;
wherein said motor is comprised of a shaft;
wherein said shaft is connected to said cam, such that when said shaft rotates said cam is rotated;
wherein said lever arm is further comprised of an impact member;
wherein said cam is in contact with said impact member;
wherein said lever arm is connected to said pivot;
wherein said light source is mounted onto said lever arm;
wherein said light source emits a beam of light;
wherein as said one or more cams rotate, said one or more cams alternatingly pushes then releases said one or more lever arms, such that said one or more lever arms pivot on said one or more pivots, such that said beam of light moves linearly in a back and forth motion between a released position of said one or more lever arms and a pushed position of said one or more lever arms;
wherein said return spring is attached to said lever arm and said housing;
wherein said return spring provides a tension against said one or more cams when said one or more cams pushes said impact member, such that said lever arm returns to said released position when said cam releases said lever arm;
wherein said controller communicates electrical signals to said motor to adjust a rotation speed of said motor;
wherein said cam is adjustable;
wherein adjusting said cam changes at least said pushed position;
wherein said pivot is adjustable; and
wherein adjusting said pivot changes said at least said pushed position.

11. The laser scanning device of claim 10, wherein said cam has a protrusion;

wherein as said cam rotates, said protrusion alternatingly pushes then releases said impact member, such that said lever arm pivots on said pivot, such that said beam of light moves linearly in said back and forth motion between said released position of said lever arm and said pushed position of said lever arm.

\* \* \* \* \*